United States Patent
Ashikhmin et al.

(10) Patent No.: US 8,094,745 B2
(45) Date of Patent: Jan. 10, 2012

(54) POWER CONTROL USING DENOISED CROSSTALK ESTIMATES IN A MULTI-CHANNEL COMMUNICATION SYSTEM

(75) Inventors: Alexei E. Ashikhmin, Morristown, NJ (US); Philip Alfred Whiting, New Providence, NJ (US)

(73) Assignee: Alcatel Lucent, Paris (FR)

( * ) Notice: Subject to any disclaimer, the term of this patent is extended or adjusted under 35 U.S.C. 154(b) by 536 days.

(21) Appl. No.: 12/352,896

(22) Filed: Jan. 13, 2009

(65) Prior Publication Data

US 2010/0177855 A1 Jul. 15, 2010

(51) Int. Cl.
*H04B 15/00* (2006.01)
(52) U.S. Cl. ........ 375/285; 375/222; 375/346; 375/350; 370/201
(58) Field of Classification Search .................. 375/285, 375/346–350, 222
See application file for complete search history.

(56) References Cited

U.S. PATENT DOCUMENTS

| | | | |
|---|---|---|---|
| 6,693,992 B2 | 2/2004 | Jones et al. | |
| 6,829,293 B2 | 12/2004 | Jones et al. | |
| 6,985,521 B1 | 1/2006 | Rezvani et al. | |
| 2006/0274893 A1* | 12/2006 | Cioffi et al. | 379/399.01 |

OTHER PUBLICATIONS

X. Hou et al., "A Time-Domain Approach for Channel Estimation in MIMO-OFDM-Based Wireless Networks," IEICE Trans. Commun., Jan. 2005, pp. 3-9, vol. E88-B, No. 1.
ITU Recommendation, COM 15-C 177-E, "G.vds12: Pilot Sequence Assisted Vector Channel Estimation," Study Group 15—Contribution 177, Upzide Labs, pp. 1-6, Oct. 2006.
ITU Recommendation, COM 15-C 685-E, "G.vector: Advantages of Using a Startup Sequence for Joining Event," Study Group 15—Contribution 685, Infineon Technologies North American, pp. 1-3, Jan. 2008.
U.S. Appl. No. 12/060,653 filed in the name of A. Ashikhmin et al. on Apr. 1, 2008 and entitled "Fast Seamless Joining of Channels in a Multi-Channel Communication System."

* cited by examiner

*Primary Examiner* — Curtis Odom
(74) *Attorney, Agent, or Firm* — Ryan, Mason & Lewis, LLP

(57) ABSTRACT

An access node of a communication system is configured to generate denoised crosstalk estimates for respective channels of the system and to adjust power levels of signals transmitted over one or more of the channels based on the denoised crosstalk estimates. The access node obtains crosstalk estimates for the respective channels. The access node is configured to convert the crosstalk estimate for a given channel to a discrete transform domain, to substantially eliminate in the discrete transform domain one or more designated portions of the crosstalk estimate for the given channel, and to convert remaining portions of the crosstalk estimate for the given channel back from the discrete transform domain to obtain the corresponding denoised crosstalk estimate for the given channel. The access node may comprise one or more central offices of a DSL communication system.

20 Claims, 4 Drawing Sheets

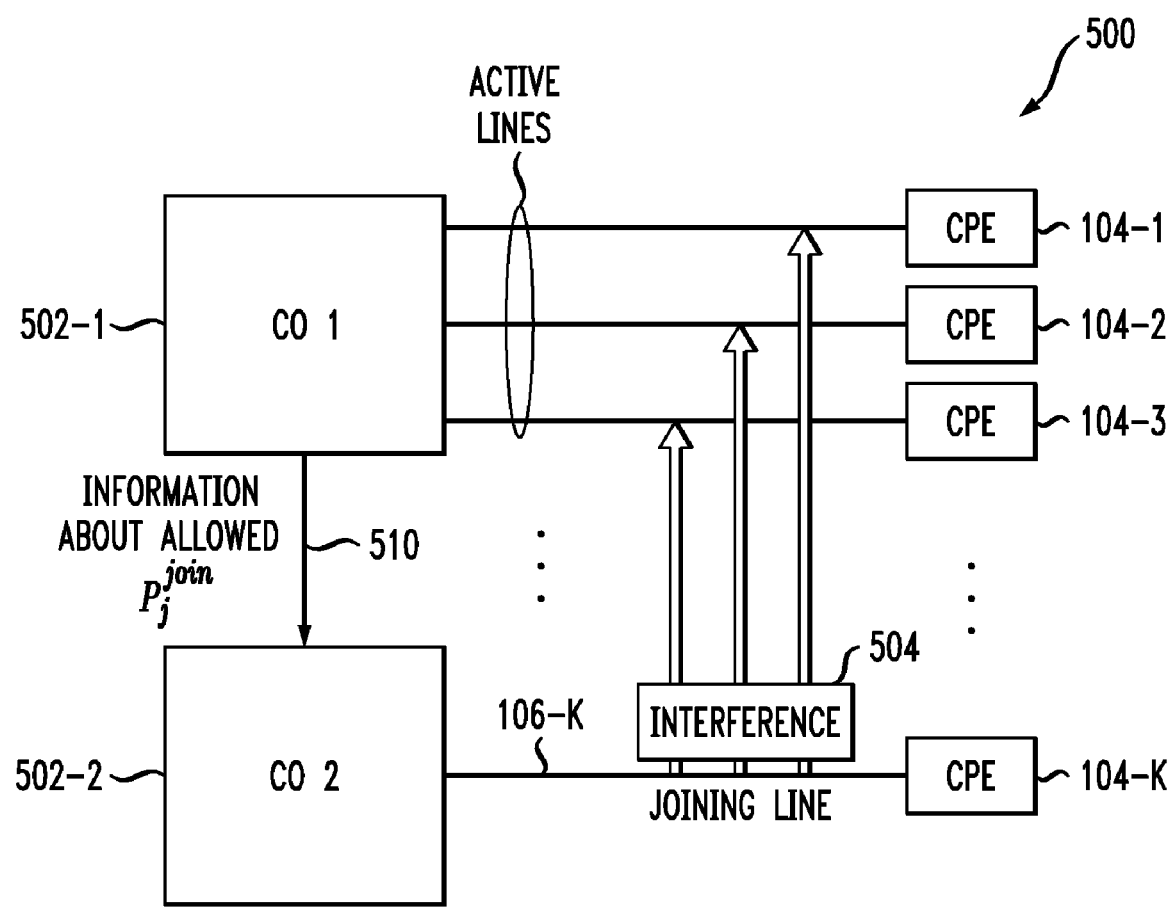

POWER CONTROL USING DENOISED CROSSTALK ESTIMATES IN A MULTI-CHANNEL COMMUNICATION SYSTEM

FIELD OF THE INVENTION

The present invention relates generally to communication systems, and more particularly to techniques for controlling crosstalk between communication channels in such systems.

BACKGROUND OF THE INVENTION

As is well known, a communication system may utilize multiple communication channels to communicate signals between transmitters and receivers of the system. For example, multiple channels may be used to separate different transmitted data signals from one another, or to provide an increased data rate.

A problem that can arise in multiple channel communication systems relates to crosstalk between the various channels, also referred to as inter-channel crosstalk. For example, digital subscriber line (DSL) broadband access systems typically employ discrete multi-tone (DMT) modulation over twisted-pair copper wires. One of the major impairments in such systems is crosstalk between multiple subscriber lines within the same binder or across binders. Thus, a transmission on one subscriber line may be detected on other subscriber lines, leading to interference that can degrade the throughput performance of the system. More generally, a given "victim" channel may experience crosstalk from multiple "disturber" channels, again leading to undesirable interference.

Dynamic spectrum management (DSM) techniques have been developed in order to combat interference and to maximize the effective throughput and reach of a DSL system. Lower level DSM techniques, commonly referred to as Level 1 and Level 2 techniques, generally adjust the power levels associated with a given subscriber line in an attempt to minimize interference. Level 3 techniques are more sophisticated, and allow active cancellation of inter-channel crosstalk through the use of a precoder.

One known approach to estimating crosstalk coefficients for downstream crosstalk cancellation in a DSL system utilizes error feedback from customer premises equipment (CPE) to a central office (CO) of the system. In such arrangements, synchronization groups may be formed, comprising multiple active lines that are synchronized with one another at a DMT symbol level. Such synchronization simplifies the operation of the precoder and increases its effectiveness.

It is often desirable to "join" an additional line to a group of active lines in a DSL system. For example, it may become necessary to activate one or more inactive lines in a synchronization group that already includes multiple active lines. In order to prevent undue interference from the joining line into the active lines, the crosstalk from the joining line into the active line should be estimated and the precoder adjusted accordingly.

Crosstalk estimates are also used in a variety of other line management applications, including determining whether or not to precode, and setting power levels on victim and disturber lines.

Accordingly, it is important to have accurate crosstalk estimates that can be generated quickly and efficiently.

SUMMARY OF THE INVENTION

The present invention in one or more illustrative embodiments provides techniques for denoising of crosstalk estimates and for controlling crosstalk based on the denoised crosstalk estimates.

In accordance with one aspect of the invention, an access node of a communication system is configured to generate denoised crosstalk estimates for respective channels of the system and to adjust power levels of signals transmitted over one or more of the channels based on the denoised crosstalk estimates. The access node obtains crosstalk estimates for the respective channels. The access node is configured to convert the crosstalk estimate for a given channel to a discrete transform domain, to substantially eliminate in the discrete transform domain one or more designated portions of the crosstalk estimate for the given channel, and to convert remaining portions of the crosstalk estimate for the given channel back from the discrete transform domain to obtain the corresponding denoised crosstalk estimate for the given channel.

The access node may comprise, for example, one or more COs of a DSL communication system and the channels may comprise respective subscriber lines of the DSL system.

The process of substantially eliminating in the discrete transform domain designated portions of the crosstalk estimate for the given channel may comprise eliminating portions of the crosstalk estimate for the given channel that do not encompass an impulse response of that crosstalk estimate in the transform domain. This may involve, for example, substantially zeroing out coefficients of the crosstalk estimate for all but L designated tones of a set of M−1 tones of the given channel. The L designated tones may comprise the first L tones of the set of M−1 tones of the given channel. Alternatively, the L designated tones may include a range of tones substantially encompassing the impulse response in the transform domain, with tones below and above the range having their respective coefficients substantially zeroed out.

In one of the illustrative embodiments, the plurality of channels comprises a set of active channels of the system and the crosstalk estimates are estimates of crosstalk from a joining channel of the system into respective ones of the active channels. In such an embodiment, the power levels of signals transmitted over one or more of the channels may be adjusted by assigning power levels to respective tones of the joining channel based on the denoised crosstalk estimates of the active channels. For example, a distribution of crosstalk estimation error may be determined based on the denoised crosstalk estimate for a given channel, and power levels assigned to respective tones of the joining channel based on the distribution of crosstalk estimation error, such that crosstalk from the joining channel into the given channel is below a specified level.

In accordance with another aspect of the invention, an access node may comprise a first CO operative to communicate over a plurality of channels with respective CPE. The first CO is operative to obtain crosstalk estimates for respective ones of the channels, and to process the crosstalk estimates to generate denoised crosstalk estimates. The plurality of channels may comprise a set of active channels of the first CO, and the crosstalk estimates may be estimates of crosstalk from a joining channel of a second CO into respective ones of the active channels of the first CO. The first CO is configured to transmit information to the second CO specifying acceptable power levels for respective tones of the joining channel, as determined from the denoised crosstalk estimates.

Advantageously, the illustrative embodiments provide a substantial reduction in average mean squared error associated with the use of crosstalk estimates in preceding. In typical applications an improvement of over 10 dB in signal-to-noise (SNR) margin is achieved. Alternatively, for a given level of SNR performance, the requisite crosstalk estimates can be obtained much more quickly than would otherwise be possible, resulting in enhanced speed of operation within the system. For example, a given line can be joined to a group of active lines in substantially less time than would otherwise be required.

These and other features and advantages of the present invention will become more apparent from the accompanying drawings and the following detailed description.

BRIEF DESCRIPTION OF THE DRAWINGS

FIG. 5 is a block diagram of a multi-channel communication system in another illustrative embodiment of the invention.

DETAILED DESCRIPTION OF THE INVENTION

The present invention will be illustrated herein in conjunction with exemplary communication systems and associated techniques for denoising of crosstalk estimates in such systems. The denoised crosstalk estimates may be used in conjunction with joining subscriber lines or other communication channels to a group of active channels in such systems, or for other line management functions. It should be understood, however, that the invention is not limited to use with the particular types of communication systems, denoising techniques and channel estimate applications disclosed. The invention can be implemented in a wide variety of other communication systems, using alternative denoising implementations, and in numerous alternative applications involving the use of channel estimates. For example, although illustrated in the context of DSL systems based on DMT modulation, the disclosed techniques can be adapted in a straightforward manner to a variety of other types of wired or wireless communication systems, including cellular systems, multiple-input multiple-output (MIMO) systems, Wi-Fi or WiMax systems, etc.

Figure 1:
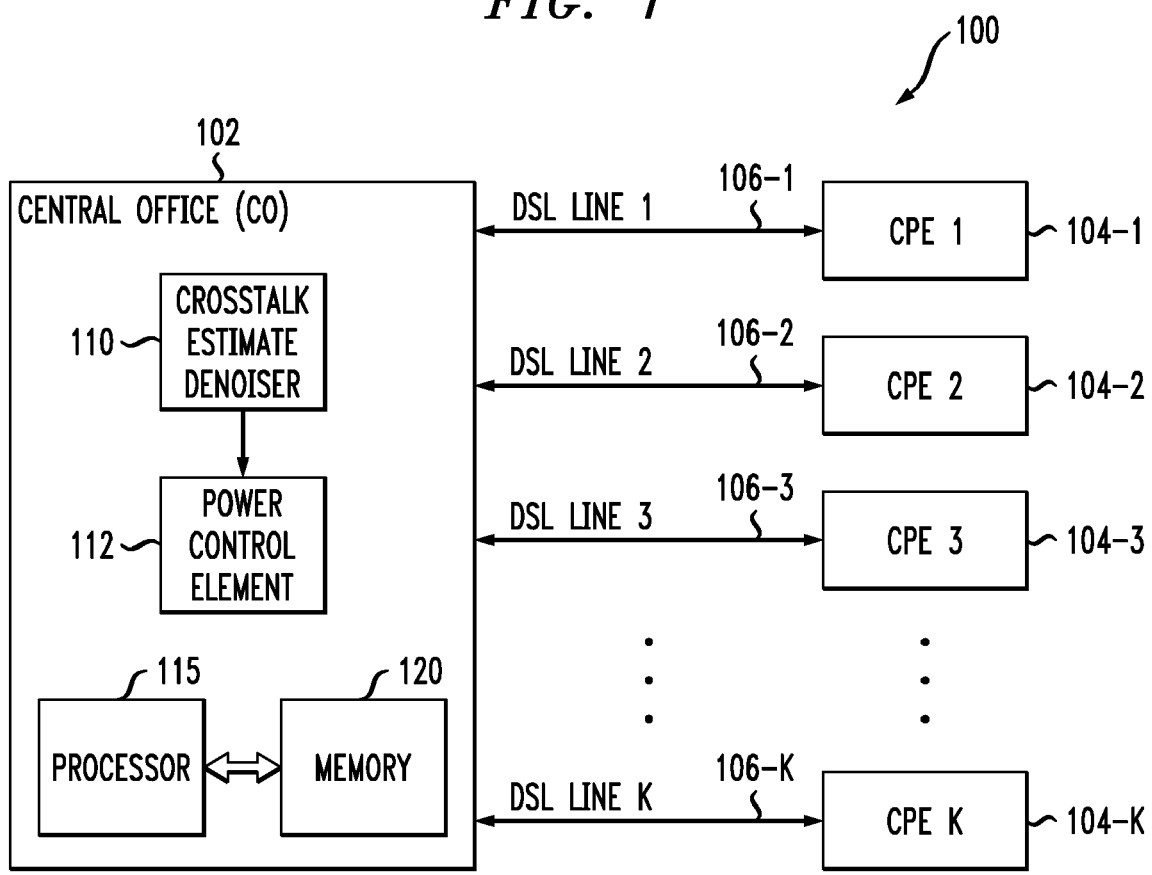
FIG. 1 is a block diagram of a multi-channel communication system in an illustrative embodiment of the invention.

FIG. 1 shows a communication system 100 comprising a central office (CO) 102 and customer premises equipment (CPE) 104. The CPE 104 more particularly comprises K distinct CPE elements that are individually denoted CPE 1, CPE 2, . . . CPE K, and are further identified by respective reference numerals 104-1, 104-2, . . . 104-K as shown. A given CPE element may comprise, by way of example, a modem, a computer, or other type of communication device, or combinations of such devices. The CO 102 is coupled to these CPE elements via respective subscriber lines denoted Line 1, Line 2, . . . Line K, each of which may comprise, for example, a twisted-pair copper wire connection.

In an illustrative embodiment, fewer than all of the K lines 106-1 through 106-K are initially active lines, and at least one of the K lines is a "joining line" that is to be activated and joined to an existing group of active lines. The initially active lines are an example of what is referred to herein as a "group" of active lines. Such a group may be, for example, a synchronization group, which may also be referred to as a precoding group, or any other type of grouping of active lines.

Communications between the CO 102 and the CPE 104 include both downstream and upstream communications for each of the active lines. The downstream direction refers to the direction from CO to CPE, and the upstream direction is the direction from CPE to CO. Although not explicitly shown in FIG. 1, it is assumed without limitation that there is associated with each of the subscriber lines of system 100 a CO transmitter and a CPE receiver for use in communicating in the downstream direction, and a CPE transmitter and a CO receiver for use in communicating in the upstream direction. The corresponding transmitter and receiver circuitry can be implemented in the CO and CPE using well-known conventional techniques, and such techniques will not be described in detail herein.

The CO 102 in the present embodiment comprises a crosstalk estimate denoiser 110 coupled to a power control element 112. The CO obtains crosstalk estimates for respective ones of at least a subset of the lines 106, and processes the crosstalk estimates in denoiser 110 to generate denoised crosstalk estimates. The power control element 112 is used to adjust power levels of signals transmitted over one or more of the lines based on the denoised crosstalk estimates.

As will be described in greater detail below, the crosstalk estimate denoiser 110 processes the crosstalk estimate for a given one of the lines 106 by converting that estimate to a discrete transform domain, substantially eliminating in the discrete transform domain one or more designated portions of the estimate, and converts remaining portions of the estimate back from the discrete transform domain to obtain the corresponding denoised crosstalk estimate for the given line.

The CO 102 further comprises a processor 115 coupled to a memory 120. The memory may be used to store one or more software programs that are executed by the processor to implement the functionality described herein. For example, functionality associated with denoiser 110 and power control element 112 may be implemented at least in part in the form of such software programs. The memory is an example of a computer-readable storage medium that stores executable program code.

The CO 102 may be viewed as an example of what is more generally referred to herein as an "access node" of a communication system. As will be described below in conjunction with FIG. 5, a single access node may, but need not, comprise multiple COs. Another example of a possible access node as that term is used herein is a DSL access multiplexer (DSLAM).

The terms "customer premises equipment" or CPE should be construed generally as including other types of user equipment in the context of non-DSL systems.

Figure 2:
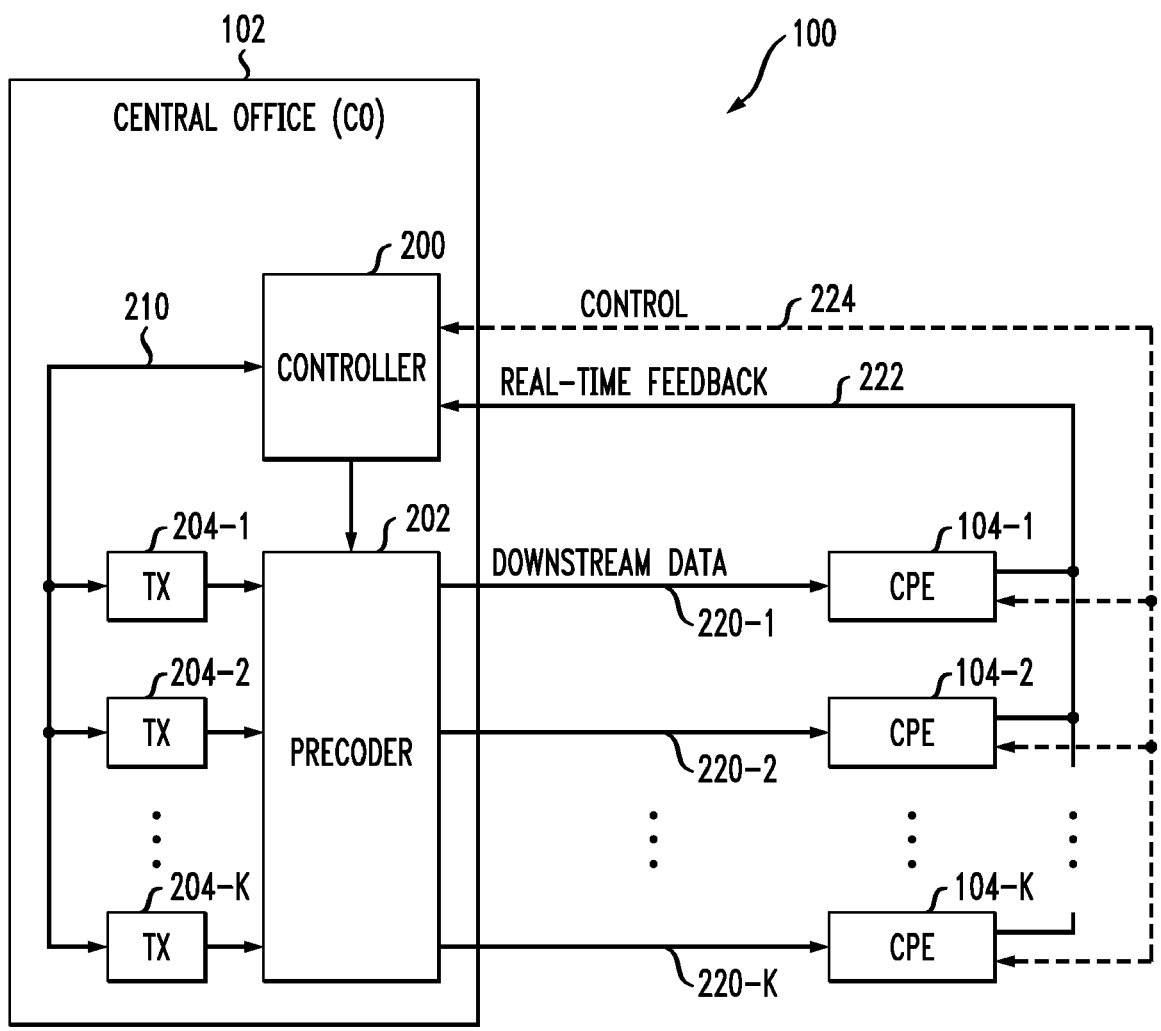
FIG. 2 shows a more detailed view of one possible implementation of the FIG. 1 system.

Referring now to FIG. 2, the central office 102 is shown in this particular implementation as including a controller 200, a precoder 202, and a set of K transmitters denoted 204-1 through 204-K. The controller is coupled to the precoder and the transmitters for controlling the transmission of downstream signals in system 100. The transmitters generate respective streams of DMT symbols that are transmitted over downstream data paths 220-1 through 220-K to respective CPE 104-1 through 104-K. The precoder 202 utilizes crosstalk estimates to adjust the downstream signals prior to transmission in a manner that tends to cancel out the crosstalk introduced in traversing the downstream data paths.

The downstream data paths 220 shown in FIG. 2 represent downstream signal paths of the respective DSL lines 106 shown in FIG. 1. The system 100 also includes real-time feedback signal paths 222, which may be upstream signal paths of respective active ones of the DSL lines 106 shown in FIG. 1. It should be noted that a joining line does not have such a real-time feedback signal path until such time as the line is joined to the group and becomes active. The controller 200 supplies control signals to the CPE via control signal paths 224, which may represent, for example, one or more designated and otherwise conventional control channels within the DSL lines 106.

It should be noted that the controller 200 and precoder 202 may be implemented in whole or in part using the processor 115 of FIG. 1. For example, portions of the functionality associated with the elements 200 and 202 may be implemented in the form of software running on processor 115.

Each of the CPE 104 may be configurable into multiple modes of operation responsive to control signals supplied by the CO 102 over control signal paths 224, as described in U.S. patent application Ser. No. 12/060,653, filed Apr. 1, 2008 and entitled "Fast Seamless Joining of Channels in a Multi-Channel Communication System," which is commonly assigned herewith and incorporated by reference herein. Such modes of operation may include, for example, a joining mode and a tracking mode. However, this type of multiple mode operation is not a requirement of the present invention.

As indicated previously, the CO 102 in the system 100 is advantageously configured to provide denoising of crosstalk estimates, as will now be described in greater detail. The denoising process will be illustrated in the context of a given line joining a group of active lines, but it should be understood that the denoising process can be adapted for use in other types of line management applications, such as determining whether or not to precode, and setting power levels on victim and disturber lines.

The crosstalk from a disturber line into a victim line can be represented by a single complex vector h which has as many components as there are DMT tones. For example, a given implementation of the system 100 may utilize 4096 DMT tones, in which case h would include 4096 components, one for each tone. Each component may be viewed as comprising a coefficient, also referred to herein as a crosstalk channel coefficient.

Figure 3:
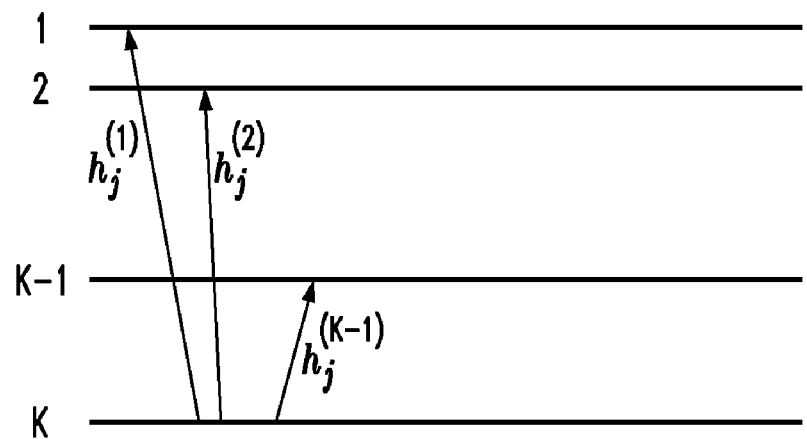
FIG. 3 illustrates crosstalk between a joining line and multiple active lines in an illustrative embodiment of the invention.

FIG. 3 illustrates an example of a joining arrangement involving the K lines 106 previously described in conjunction with FIGS. 1 and 2. In this example, lines 1, ... K−1 collectively form a group of active lines and line K is a new joining line. It is assumed that the crosstalk channel coefficients between the active lines are known and that the precoder 202 is utilizing these coefficients to suppress the interference between the active lines. It is desired to obtain estimates of the crosstalk channel coefficients $h_j^{(1)}, h_j^{(2)}, \ldots, h_j^{(K-1)}$ between the joining line and each of the active lines. Using these estimates the precoder 202 will be able to significantly reduce the interference between the joining and active lines. The more accurate the estimates, the greater the reduction in the interference.

To simplify the notation used in the following description, we focus initially on the crosstalk channel coefficients between lines 1 and K, and therefore denote by $h_j = h_j^{(1)}$ the crosstalk channel coefficient corresponding to the j-th tone. It is further assumed that there are M tones, such that $0 \leq j \leq M-1$.

One possible approach is to accumulate a sufficient number of estimates $\hat{h}_j$, for each tone j, such that the error is brought to an acceptable level. If each tone is estimated independently, then the number of measurements T needed to reach a given mean squared error for a given fixed measurement noise $\sigma_j^2$ can be determined as follows:

$$\text{Mean squared error} = \mathbb{E}\left[|\hat{h}_j - h_j|^2\right] = \frac{\sigma_j^2}{T},$$

where $\mathbb{E}$ denotes expected value. However, since a large number of measurements may be required for each tone, this approach can lead to a substantial delay in joining the new channel to the active group.

The present embodiment provides a more efficient technique to obtain accurate estimates $\hat{h}_j$ based on use of the Discrete Fourier Transform (DFT).

We will denote by a vector F the DFT of a vector f. Assume that we have the following noisy estimates of the crosstalk channel coefficients:

$$x = (x_0, \ldots, x_{M-1})$$

where $$x = h + z$$

and z is a noise measurement vector of independent, identically distributed complex normals $CN(0, N_j)$, where as indicated previously $j = 0 \ldots M-1$. An exemplary process for denoising the noisy estimates and controlling crosstalk from the joining line into the active lines based on the denoised estimates is as follows:

1. Compute X by taking the DFT of x.
2. Assign $Y_j = X_j, j = 0, \ldots, L-1$ and $Y_j = 0, j = L, \ldots, M-1$.
3. Compute, using the inverse DFT, y from Y.
4. Assign $\hat{h}_j = y_j, j = 0, \ldots, M-1$.
5. Determine the probability distribution $p_e$ of the crosstalk estimation error $e_j = |h_j - \hat{h}_j|^2$.
6. Using $p_e$ assign powers $P_j$ for the tones of the joining line in order to guarantee provably limited interference $I_j = P_j \cdot e_j$ between the joining line and the active lines.

Steps 1 through 4 represent the denoising part of the process and Steps 5 and 6 represent the crosstalk control part of the process.

This exemplary denoising as described above basically utilizes the portion of the noisy estimates corresponding to the first L of the M−1 tones and zeros out the portion corresponding to the remaining tones.

Figure 4:
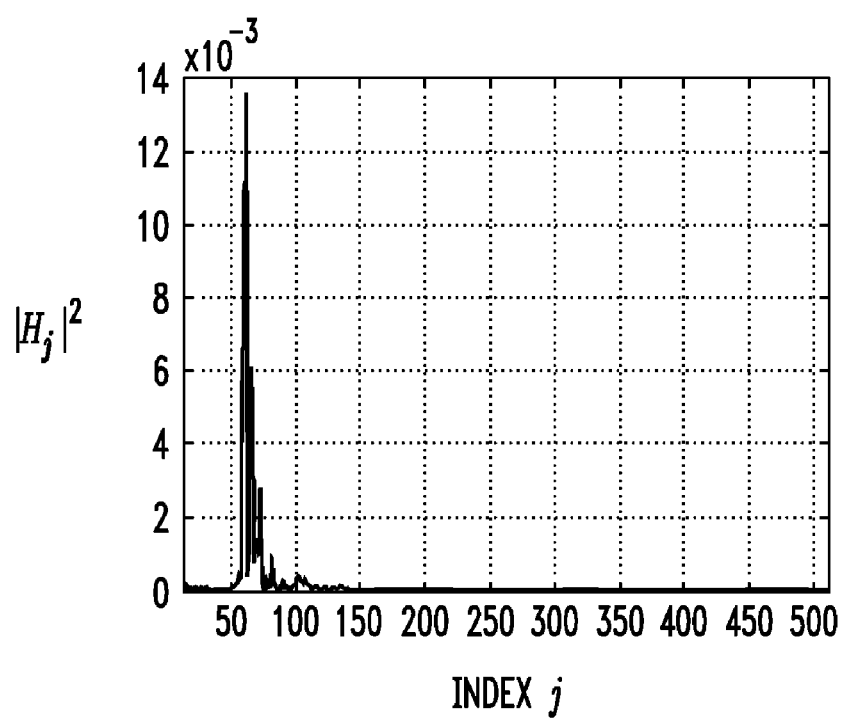
FIG. 4 is a plot of squared magnitude of a discrete Fourier transform of a crosstalk estimate vector.

With reference to FIG. 4, the squared magnitude $|H_j|^2$ of the DFT of an exemplary vector h of crosstalk coefficients is plotted as a function of tone index j. In this example, M=2991. As is apparent from the figure, the plot may be viewed as forming an impulse response that is relatively short in duration, concentrated between j=50 and j=150. By zeroing all but the first 175 tones in this particular example, and then taking the inverse DFT of the result, the original vector h is closely approximated.

The amount of noise reduction achieved as a result of denoising the crosstalk estimates is substantial. The noise reduction obtained, assuming all coefficients outside L are effectively zero and uniform measurement noise, is given by:

$$\text{Noise Reduction} = -10 \log_{10} \frac{L}{M}.$$

Thus, with reference to the above-noted example in which L=175 and M=2991, the noise reduction in the crosstalk estimates is $10 \log_{10} 2991/175 \approx 12.3$ dB or over a factor of 10. Use of the resulting denoised crosstalk estimates in the precoder 202 of FIG. 2 translates to a gain of 12.3 dB in SNR when precoding on the downlink. The denoised crosstalk estimates can also be used in other applications, such as postcoding on the uplink, with no additional estimation required.

More generally, the impact of denoising may be described as follows. Assuming that the average mean squared error per tone before measurement was a uniform value of E prior to denoising, it becomes E/10 after denoising. This translates directly into effectiveness of the preceding, providing an additional 10 dB of margin.

Reduction in error can also be translated into the same error with fewer measurements, and thus less time to acquire the coefficients. This results in enhanced speed of operation within the system. For example, a given line can be joined to a group of active lines in substantially less time than would otherwise be required.

A number of different techniques may be used to choose appropriate values for parameter L in the above-described denoising and crosstalk control process. For example, in some cases L can be determined using a priori knowledge of the lines 1 and K. More particularly, the width and location of the above-noted impulse might be determined by line characteristics such as line length, the gauge of the line, etc. Any such side information may be used to achieve further reduction in the variance of the crosstalk estimates. Alternatively, statistical techniques can be used to determine an optimal L.

In the exemplary process described above, denoised estimates were determined from corresponding noisy estimates of the crosstalk from the joining line K into each of the lines . . . K−1 of the active group. Similar techniques can be applied to obtain denoised estimates from corresponding noisy estimates of the crosstalk from each of the active lines 1 . . . K−1 into the joining line K. There is no requirement to know the distribution or other characteristics of the underlying noise, although it is of course advantageous if such characteristics are known or have been estimated.

Exemplary techniques for power setting in Steps 5 and 6 of the above process will now be described in greater detail.

In Step 5, to determine the probability distribution $p_e$ of crosstalk estimation error we proceed as follows. If the measurement noise vector $z=(N_0, N_1, \ldots, N_{M-1})$ is known in advance, the error distribution for tone m may be determined as:

$$E[e_m] = \frac{1}{M^2} \sum_{j=0}^{M-1} N_j \frac{\left(1 - \cos\left(2\pi \frac{(m-j)L}{M}\right)\right)}{\left(1 - \cos\left(2\pi \frac{(m-j)}{M}\right)\right)} = \mu_m$$

From the assumptions above, $z_m$ is a complex Gaussian random variable and therefore the probability density function of $e_m$ is given by $$p_{e_m}(x) = \frac{1}{\mu_m} e^{-x/\mu_m}.$$

As indicated previously, $I_m$ denotes the interference between the joining and the active line. This interference occurs if the estimate $\hat{h}_m$ is utilized in the precoder 202.

In Step 6 of the process, the power $P_m$ may be assigned so that the interference $I_m$ will be greater than a critical value $I_m^{cr}$ only with a very small probability $P_{err}$. For example, we can set $P_{err}=10^{-8}$. The power can then be assigned as follows:

$$P_m = I_m^{cr}(-\log P_{err})\mu_m.$$

In this case, $$Pr(I_m \leq I_m^{cr}) \leq P_{err}.$$

The power $P_m$ in the foregoing description has been set to constrain the interference from line K to line 1. A similar calculation can be performed for lines 2, . . . , K−1 and the minimum power selected, ensuring that no line exceeds the target interference with probability greater than $P_{err}$. A variety of other techniques can be used to select $P_m$ based on the denoised crosstalk estimates, as will be appreciated by those skilled in the art.

The foregoing assumed that the measurement noise vector z was known in advance. In other embodiments, the measurement noise vector may not be known, in which case estimates or bounds may be used instead.

In the process as described above, denoised estimates were generated by zeroing out tones above the impulse. However, alternative arrangements are possible. For example, if the impulse is not located near zero, the process may be adjusted to zero out tones above and below the impulse. Thus, the process may be adjusted to restrict h to a designated subband of frequencies, such as those used for downstream communication, as the impulse characteristic in the transform domain will be retained.

In addition, complete zeroing out is not required. Instead, one or more tones could be minimized or otherwise substantially eliminated, without necessarily reducing them to zero.

It should also be noted that noisy estimates are not needed for every single tone. For example, the process as described above could be adapted for use in situations in which measurements are unavailable for a small fraction of the tones.

In the illustrative embodiment of FIG. 3 the joining line and the active lines are all associated with the same CO 102. However, in other embodiments, these lines may be distributed across multiple COs. FIG. 5 shows an example of an arrangement of this type. A multi-channel communication system 500 comprises a first CO 502-1 and a second CO 502-2, also denoted CO 1 and CO 2, respectively. The CPE 104-1, 104-2, 104-3, and possibly others, are served by CO 502-1, while CPE 104-K, and possibly others, are served by CO 502-2. As in the example of FIG. 3, line 106-K is joining an active group that comprises lines 1 through K−1. The interference created in the active lines due to crosstalk from the joining line is indicated generally at 504.

The two COs in the FIG. 5 embodiment may be from different vendors. For example, it is well known that in conventional systems, several COs of distinct vendors can be connected to the same bundle of DSL lines. Under these and other conditions, the various COs may have to interact with one another in order to achieve optimal interference cancellation. In the present embodiment, CO 1 estimates the crosstalk coefficients $h_j^2$, j=0, . . . , M−1, from the joining line K of CO 2. CO 1 also passes to CO 2 via connection 510 information specifying the maximum levels of powers $P_j^{join}$, j=0, . . . , M−1, that can be used in the joining line of CO 2 that would not cause dropping of any of the active lines 1 through K−1. The process of estimation of $h_j$, j=0, . . . , M−1, and determination of $P_j^{join}$, j=0, . . . , M−1, should be very fast to prevent long joining delays in CO 2, and may be implemented using Steps 1 through 6 as described previously. It may be beneficial for this interaction to be standardized so as to minimize delays for COs produced by different vendors.

It should be noted that the two COs in the FIG. 5 embodiment may be viewed as comprising a single access node. Alternatively, each such central office may be viewed as a separate access node.

As indicated above, the illustrative embodiments advantageously reduce crosstalk coefficient noise, leading to improved SNR or equivalently faster coefficient acquisition time for a given level of SNR performance.

The denoising techniques described herein can be applied to crosstalk coefficients obtained via any suitable approach, including by way of example SNR feedback from the CPE to the CO, and synchronization symbol based error feedback. Such feedback may be provided via feedback line 222 in the FIG. 2 embodiment. In some cases of coefficient estimation, for example SNR based estimation, coefficient estimates are provided relatively slowly, say once every 10 seconds. Denoising is particularly advantageous in such applications where joining might be reduced to a much smaller number of estimation steps and hence significantly reduced joining time. The disclosed techniques thus facilitate the provision of fast, seamless joining of one or more additional DSL lines or other channels to a given set of active lines or other channels, but as previously noted can be applied to numerous other line management applications.

An example of another line management application that can benefit from the denoising techniques described herein is the use of crosstalk estimates in determining SNR margin. An SNR margin is used in a DSL system for a variety of reasons. One such reason is to allow for additional crosstalk which may arise following activation of a particular line. Providing sufficient margin helps to ensure that addition of a new active line will not cause dropping of an existing active line. Also, if the crosstalk of a disturber line can be quickly estimated, then a downward rate adjustment can be made for the corresponding victim line, allowing the additional interference to be accommodated even in the absence of precoding. Such real-time rate adjustments can make it possible to work with a reduced SNR margin and therefore at a higher rate overall.

It should also be noted that the denoising techniques can be applied to upstream bands in addition to or in place of downstream bands. For example, denoising can be applied jointly to noisy estimates for tones which lie in contiguous upstream and downstream bands. This latter approach may be achieved in a given embodiment by applying the DFT to the set of estimates for both bands treated as a whole.

Any of a wide variety of known precoding techniques may be used to implement crosstalk cancellation for multiple joining and active lines of the type described herein. Such preceding techniques are well understood by those skilled in the art and therefore will not be further described.

Embodiments of the present invention may be implemented at least in part in the form of one or more software programs that are stored in a memory or other processor-readable medium of CO 102 or CPE 104 of system 100. Such programs may be retrieved and executed by a processor in the CO or CPE. The controller 200 may be viewed as an example of such a processor. Of course, numerous alternative arrangements of hardware, software or firmware in any combination may be utilized in implementing these and other systems elements in accordance with the invention.

It should again be emphasized that the embodiments described above are presented by way of illustrative example only. Other embodiments may use different communication system configurations, CO and CPE configurations, communication channels, and denoising and crosstalk control process steps, depending on the needs of the particular communication application. Alternative embodiments may therefore utilize the techniques described herein in other contexts in which it is desirable to quickly obtain crosstalk coefficients for at least a subset of tones.

In the illustrative embodiment of FIG. 2, it is assumed that all of the lines are subject to precoding. However, other embodiments need not be so configured, and one or more lines may not have associated precoding. In an arrangement of this type, the disclosed techniques may be used to measure how much crosstalk would be caused in non-precoded active lines, and a determination may then be made to reduce the power level on certain tones that are giving rise to this interference.

It should also be noted that the particular assumptions made in the context of describing the illustrative embodiments should not be construed as requirements of the invention. The invention can be implemented in other embodiments in which these particular assumptions do not apply.

These and numerous other alternative embodiments within the scope of the appended claims will be readily apparent to those skilled in the art.

What is claimed is:

1. A method of controlling crosstalk between channels of a communication system, the method comprising the steps of:
    obtaining crosstalk estimates for respective ones of the channels;
    processing the crosstalk estimates to generate denoised crosstalk estimates; and
    adjusting power levels of signals transmitted over one or more of the channels based on the denoised crosstalk estimates;
    wherein the step of processing the crosstalk estimates comprises for a given one of the channels the steps of converting the crosstalk estimate for the given channel to a discrete transform domain, substantially eliminating in the discrete transform domain one or more designated portions of the crosstalk estimate for the given channel, and converting remaining portions of the crosstalk estimate for the given channel back from the discrete transform domain to obtain the corresponding denoised crosstalk estimate for the given channel.

2. The method of claim 1 wherein the obtaining step comprises determining the crosstalk estimates in a central office of the system utilizing feedback from respective customer premises equipment coupled to the central office via respective ones of the channels.

3. The method of claim 1 wherein the step of substantially eliminating in the discrete transform domain designated portions of the crosstalk estimate for the given channel further comprises substantially eliminating portions of the crosstalk estimate for the given channel that do not encompass an impulse response of that crosstalk estimate in the transform domain.

4. The method of claim 1 wherein the step of substantially eliminating in the discrete transform domain designated portions of the crosstalk estimate for the given channel further comprises substantially zeroing out coefficients of the crosstalk estimate for all but L designated tones of a set of M−1 tones of the given channel.

5. The method of claim 4 wherein the L designated tones comprise the first L tones of the set of M−1 tones of the given channel.

6. The method of claim 4 wherein the L designated tones comprise a range of tones substantially encompassing an impulse response in the transform domain of the crosstalk estimate for the given channel such that coefficients for tones below the range and tones above the range are substantially zeroed out.

7. The method of claim 1 wherein the crosstalk estimate for the given channel is represented by a vector $$x=(x_0, \ldots, x_{M-1})$$

where the given channel comprises M−1 tones.

8. The method of claim 7 wherein the processing step comprises the steps of:

computing X by taking a discrete Fourier transform of x;
computing Y by assigning $Y_j=X_j$, j=0, ..., L−1 and $Y_j=0$, j=L, ..., M−1;
computing y by taking the inverse discrete Fourier transform of Y; and
generating the denoised crosstalk estimate for the given channel as a vector having elements $\hat{h}_j=y_j$, j=0, ..., M−1.

9. The method of claim 1 wherein the step of adjusting power levels of signals transmitted over one or more of the channels further comprises the step of configuring a precoder of the system to provide power levels for the transmitted signals that limit crosstalk from one channel into the given channel to below a specified level.

10. The method of claim 1 wherein the plurality of channels comprises a set of active channels of the system and the crosstalk estimates are estimates of crosstalk from a joining channel of the system into respective ones of the active channels.

11. The method of claim 10 wherein the step of adjusting power levels of signals transmitted over one or more of the channels based on the denoised crosstalk estimates further comprises the step of assigning power levels to respective tones of the joining channel based on the denoised crosstalk estimates of the active channels.

12. The method of claim 1 wherein the step of adjusting power levels of signals transmitted over one or more of the channels based on the denoised crosstalk estimates further comprises the steps of:
determining a distribution of crosstalk estimation error based on the denoised crosstalk estimate for the given channel; and
assigning power levels to respective tones of another one of the channels based on the distribution of crosstalk estimation error such that crosstalk from the other channel into the given channel is below a specified level.

13. The method of claim 12 wherein the step of assigning power levels to respective tones of another one of the channels further comprises assigning a power level $P_m$ to an m-th one of the tones of the other channel such that crosstalk interference $I_m$ from the other channel into the given channel will be greater than a critical value $I_m^{cr}$ with probability $P_{err}$:

$$Pr(I_m \leq I_m^{cr}) \leq P_{err},$$

and further wherein $$P_m = I_m^{cr}(-\log P_{err})\mu_m$$

where $\mu_m$ is the expected value of the crosstalk estimation error for tone m.

14. An apparatus comprising:
a first central office operative to communicate over a plurality of channels with respective customer premises equipment;
the first central office comprising a precoder;
wherein the central office is further operative to obtain crosstalk estimates for respective ones of the channels, and to process the crosstalk estimates to generate denoised crosstalk estimates;
wherein the plurality of channels comprises a set of active channels of the first central office, and the crosstalk estimates are estimates of crosstalk from a joining channel of a second central office into respective ones of the active channels of the first central office; and
wherein the first central office is configured to transmit information to the second central office specifying acceptable power levels for respective tones of the joining channel, as determined from the denoised crosstalk estimates.

15. An apparatus comprising:
an access node adapted for communication over a plurality of channels of a multi-channel communication system;
the access node comprising a processor coupled to a memory;
wherein the access node is operative to obtain crosstalk estimates for respective ones of the channels, to process the crosstalk estimates to generate denoised crosstalk estimates, and to adjust power levels of signals transmitted over one or more of the channels based on the denoised crosstalk estimates;
wherein in processing the crosstalk estimate for a given one of the channels the access node is further operative to convert the crosstalk estimate for the given channel to a discrete transform domain, to substantially eliminate in the discrete transform domain one or more designated portions of the crosstalk estimate for the given channel, and to convert remaining portions of the crosstalk estimate for the given channel back from the discrete transform domain to obtain the corresponding denoised crosstalk estimate for the given channel.

16. The apparatus of claim 15 wherein the access node comprises at least one central office of a DSL system.

17. The apparatus of claim 15 wherein the plurality of channels comprise respective subscriber lines of a DSL system.

18. The apparatus of claim 15 wherein the access node is operative to substantially eliminate in the discrete transform domain designated portions of the crosstalk estimate for the given channel by substantially eliminating portions of the crosstalk estimate for the given channel that do not encompass an impulse response of that crosstalk estimate in the transform domain.

19. The apparatus of claim 15 wherein the access node is operative to substantially eliminate in the discrete transform domain designated portions of the crosstalk estimate for the given channel by substantially zeroing out coefficients of the crosstalk estimate for all but L designated tones of a set of M−1 tones of the given channel.

20. The apparatus of claim 15 wherein the access node further comprises:
a first central office; and
a second central office coupled to the first central office;
wherein the plurality of channels comprises a set of active channels of the first central office, and the crosstalk estimates are estimates of crosstalk from a joining channel of the second central office into respective ones of the active channels of the first central office; and
wherein the first central office is configured to transmit information to the second central office specifying acceptable power levels for respective tones of the joining channel.

* * * * *